(12) United States Patent
Picanco et al.

(10) Patent No.: US 7,384,330 B1
(45) Date of Patent: Jun. 10, 2008

(54) METHODS AND APPARATUS FOR PROCESSING FISH AND OTHER PRODUCTS

(75) Inventors: Daniel Picanco, Peabody, MA (US);
Robert Saville, New Market, NH (US);
Michael Sirois, Portsmouth, NH (US)

(73) Assignee: Fishery Products International, Danvers, MA (US)

( * ) Notice: Subject to any disclaimer, the term of this patent is extended or adjusted under 35 U.S.C. 154(b) by 0 days.

(21) Appl. No.: 11/777,326

(22) Filed: Jul. 13, 2007

Related U.S. Application Data

(60) Provisional application No. 60/940,503, filed on May 29, 2007.

(51) Int. Cl.
*A22B 3/06* (2006.01)
(52) U.S. Cl. ........................................ 452/58
(58) Field of Classification Search ............... 452/1–6, 452/11, 149, 150, 161, 162, 198; 426/138–140
See application file for complete search history.

(56) References Cited

U.S. PATENT DOCUMENTS

| 2,149,021 | A | * | 2/1939 | Hunt | 452/135 |
| 4,056,866 | A | * | 11/1977 | Wenzel | 452/135 |
| 4,761,856 | A | * | 8/1988 | Ewing | 452/154 |
| 6,723,362 | B1 | * | 4/2004 | Rastogi | 426/274 |

* cited by examiner

*Primary Examiner*—Thomas Price
(74) *Attorney, Agent, or Firm*—Daly, Crowley, Mofford & Durkee, LLP

(57) ABSTRACT

Methods and apparatus for providing a fillet of generally uniform thickness. In one embodiment, a method includes providing a fish fillet having a loin portion and a belly portion, cutting the loin portion to provide a butterflied portion that remains attached to the loin portion, lifting the attached butterflied portion, and manipulating the attached butterflied portion over to the belly portion to provide a fillet having a generally uniform thickness across the fillet. In another embodiment, a fish fillet includes a generally uniform thickness across the fillet.

15 Claims, 9 Drawing Sheets

US 7,384,330 B1

METHODS AND APPARATUS FOR PROCESSING FISH AND OTHER PRODUCTS

CROSS REFERENCE TO RELATED APPLICATIONS

The present application claims the benefit of U.S. Provisional Patent Application No. 60/940,503, filed on May 29, 2007, which is incorporated herein by reference.

BACKGROUND

As is known in the art, commercial fishing vessels extract fish and other catch from the ocean. The fish is processed in a series of steps that lead to sale and consumption by end users. Generally, consumers cook the fish in some way prior to eating. However, conventional processing methods result in suboptimal cooking characteristics and/or waste.

As shown in FIGS. 1A and 1B, the processed fish fillet 10 is uneven from dorsal to belly. More particularly, a loin portion 12 is significantly thicker than a belly portion 14 of the fillet. When such a fillet is cooked, such as by frying, microwaving, grilling, etc., the fillet 10 is cooked to different consistencies across the fillet. More particularly, while the loin portion 12 may be cooked to a desired condition, the belly portion 14 may be overcooked. In addition, a V-cut 16 in the fillet exacerbates the uneven cooking characteristics. Users may not eat the overcooked portion due to undesirable texture and/or taste. If the belly portion 14 is cooked to taste, the loin portion 12 may be undercooked. To mitigate these uneven cooking characteristics, the fillet can be processed to remove a portion of the loin portion. While this may address cooking unevenness, this leads to lower yield and waste.

SUMMARY

The present invention provides methods and apparatus for processing fish to provide a fillet that has a consistent thickness. With this arrangement, the fillet cooks evenly across the fillet. While the invention is primarily shown and described in conjunction with processing fish, and particular fish species, it is understood that the invention is applicable to animal processing in general, for which is it desirable to provide a cut of generally uniform thickness.

In one aspect of the invention, a method comprises providing a fish fillet having a loin portion and a belly portion, cutting the loin portion to provide a butterflied portion that remains attached to the loin portion, lifting the attached butterflied portion, and manipulating the attached butterflied portion over to the belly portion to provide a fillet having a generally uniform thickness across the fillet.

The method can further include one or more of the following features: manipulating the fillet to remove a V-cut separating the loin portion and the belly portion, the fillet is a Tilapia fillet, the thickness is less than about 0.5 inch, freezing the fillet with the butterflied portion down, making the cut in a direction toward the lateral line of the fillet, and a thickness of the butterflied portion is about one-half of a difference in thickness between the loin portion and the belly portion.

In another aspect of the invention, a fish fillet includes a loin portion having a loin thickness and a belly portion having a belly thickness, and a butterflied portion cut from the loin portion and folded over to the belly portion of the fillet so as to provide a generally uniform thickness across the fillet.

BRIEF DESCRIPTION OF THE DRAWINGS

The foregoing features of this invention, as well as the invention itself, may be more fully understood from the following description of the drawings in which.

DETAILED DESCRIPTION

Figure 1A:
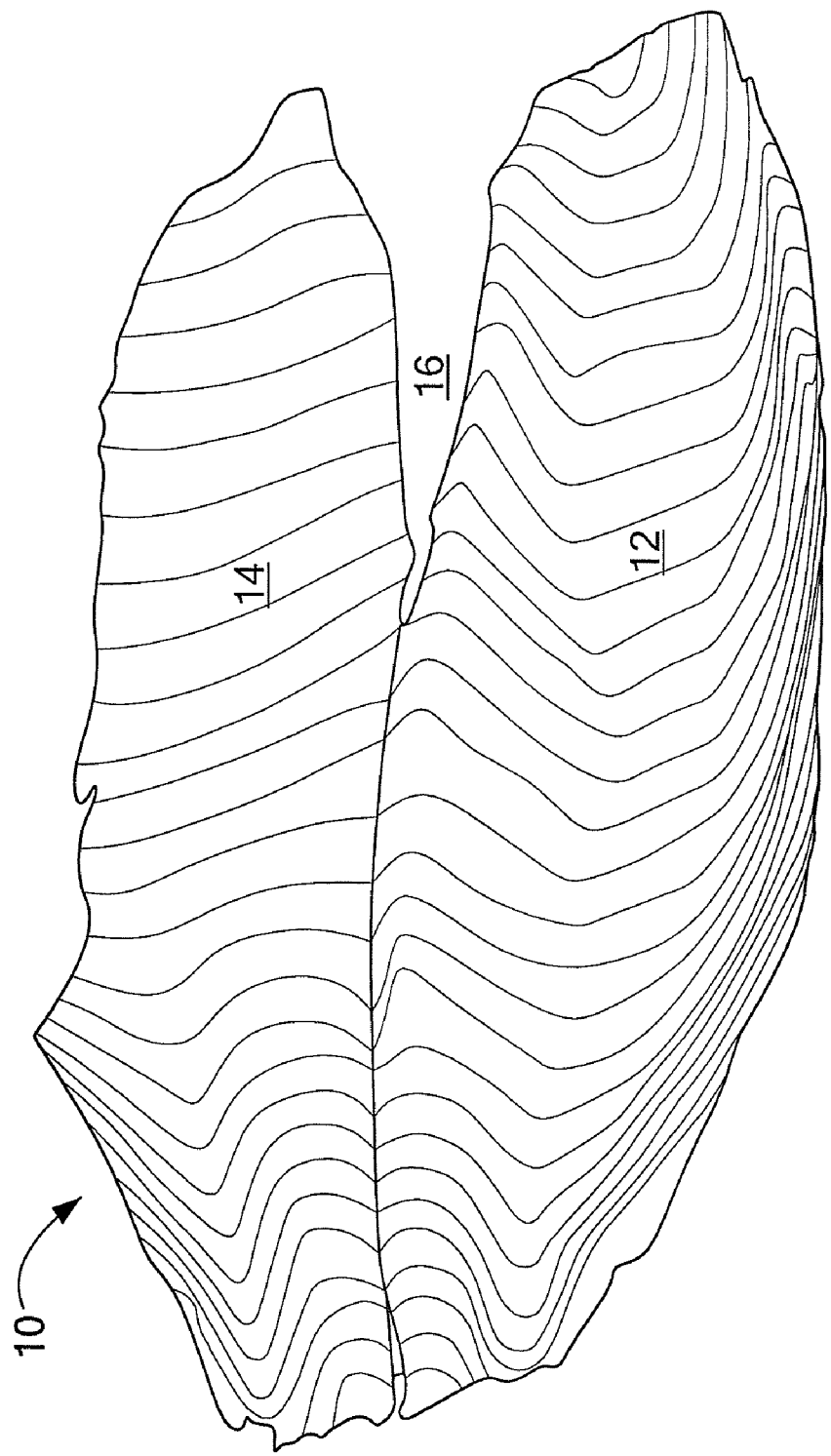
FIGS. 1A and 1B show a prior art processed fish portion.
Figure 1B:
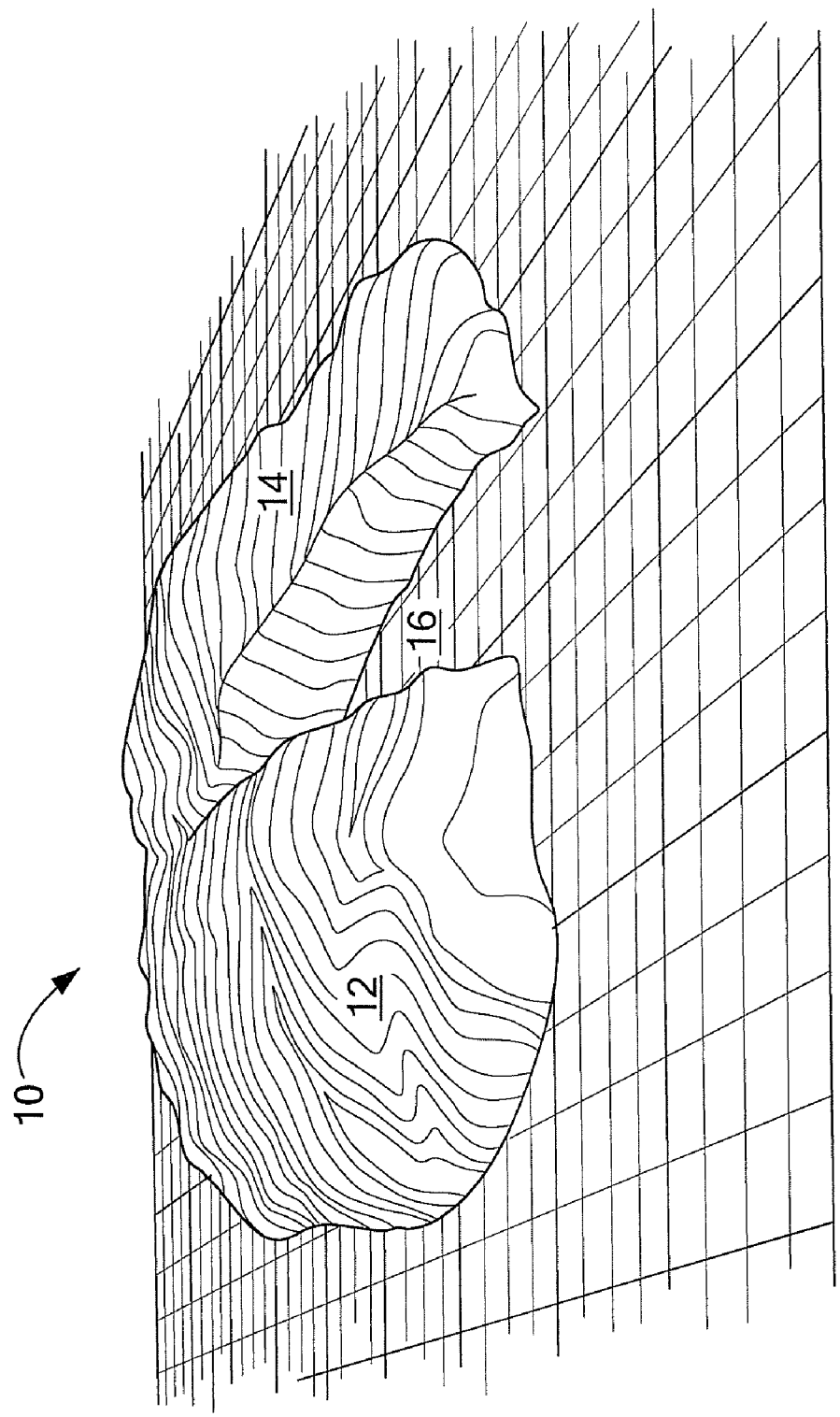
Figure 2:
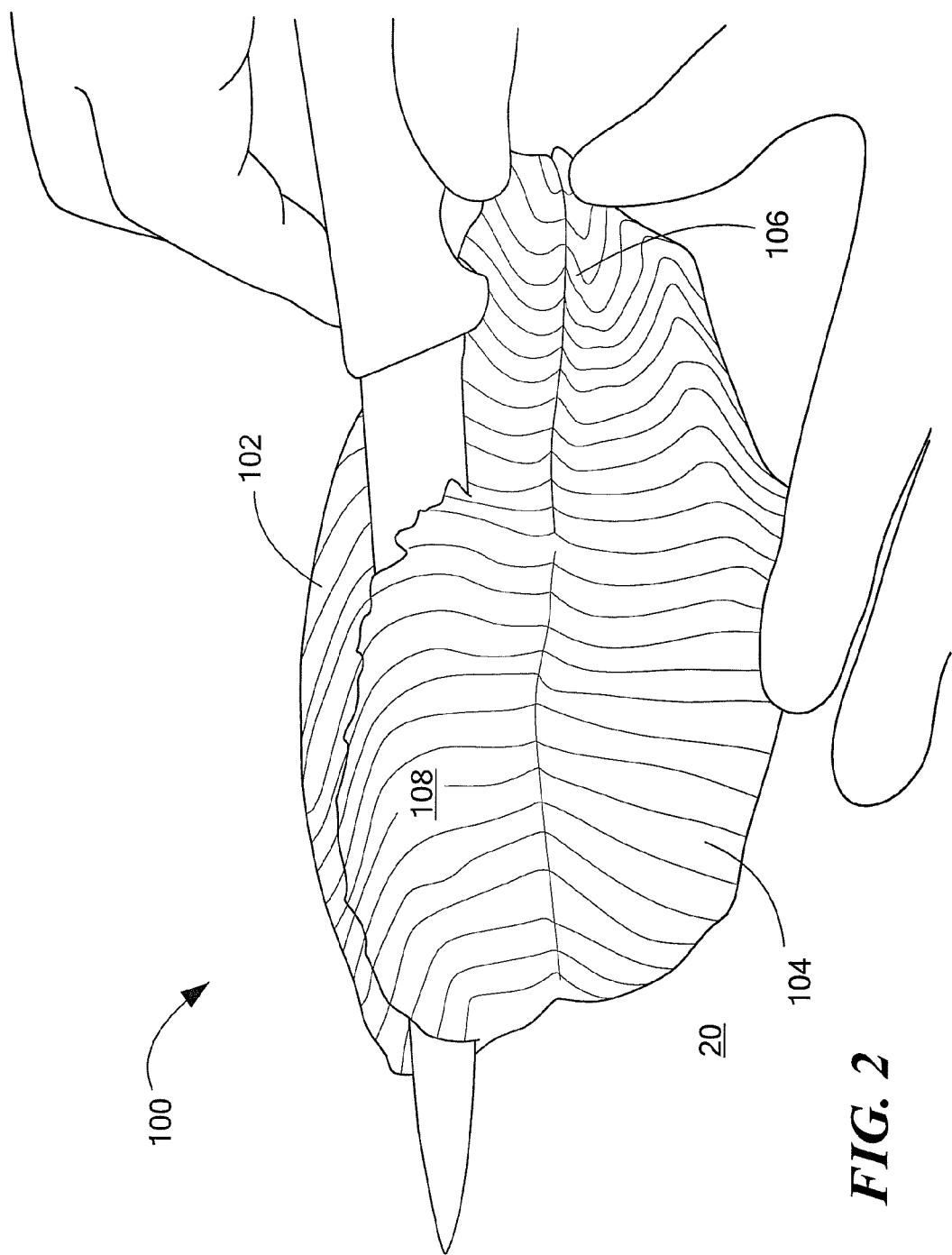
FIG. 2 shows a fish fillet processed in accordance with exemplary embodiments of the invention.

FIG. 2 shows a fillet 100 having a loin portion 102 and a thinner belly portion 104 generally separated by the lateral line 106 of the fillet. A cut is made in the loin portion 102 of the fillet to provide a flap 108 or butterflied portion that remains attached to the loin section. In an exemplary embodiment, the cut is generally parallel to a surface 20 on which the fillet 100 rests.

Figure 3:
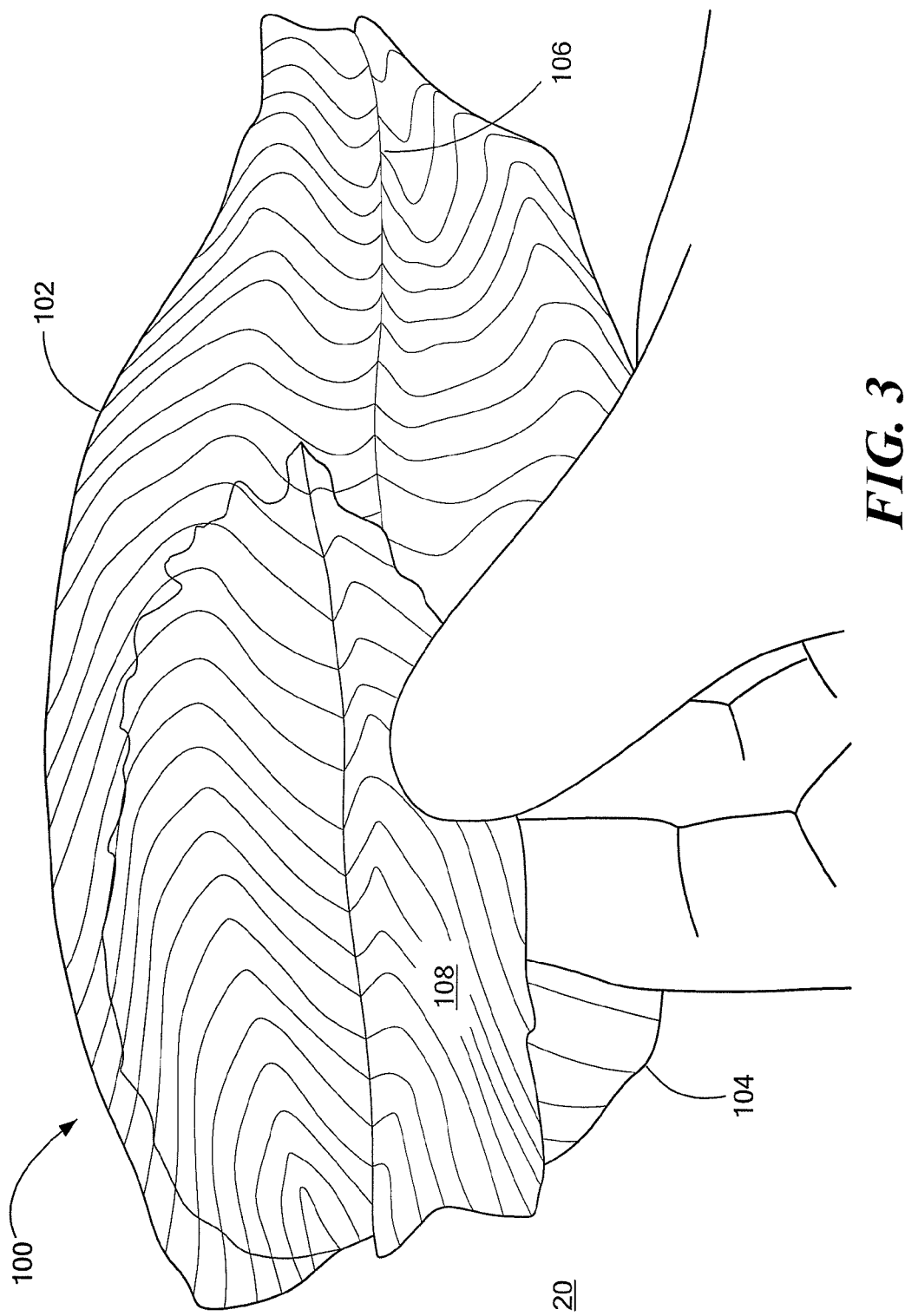
FIG. 3 shows a fish fillet processed in accordance with exemplary embodiments of the invention.

As shown in FIG. 3, the attached butterflied portion 108 can be manipulated away from the loin portion 102 while remaining attached. In the illustrated embodiment, the cut is made from an outer area of the loin portion 102 in a direction towards the lateral line 106.

Figure 4A:
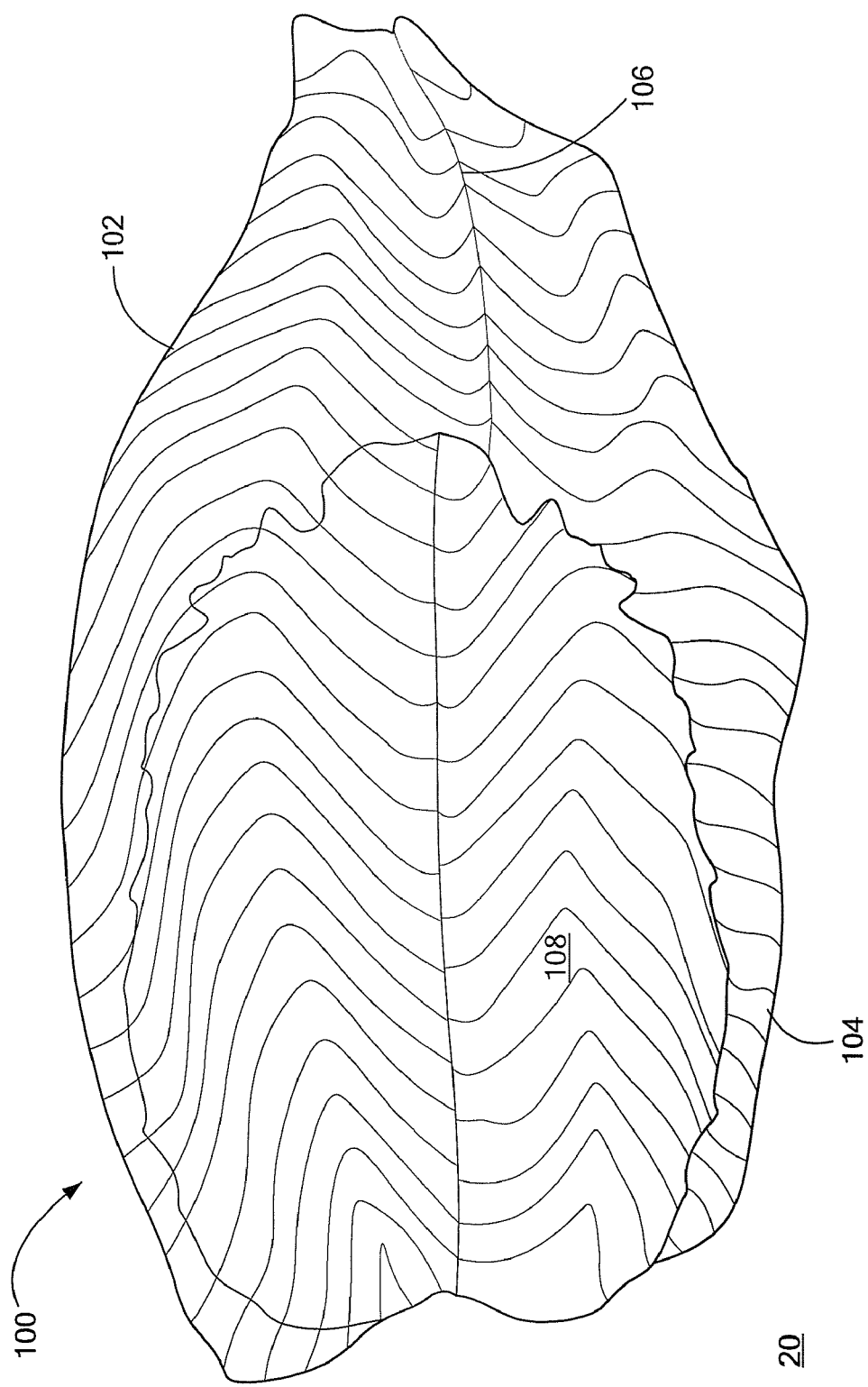
FIG. 4A shows a top pictorial view of a fish fillet processed in accordance with exemplary embodiments of the invention.
Figure 4B:
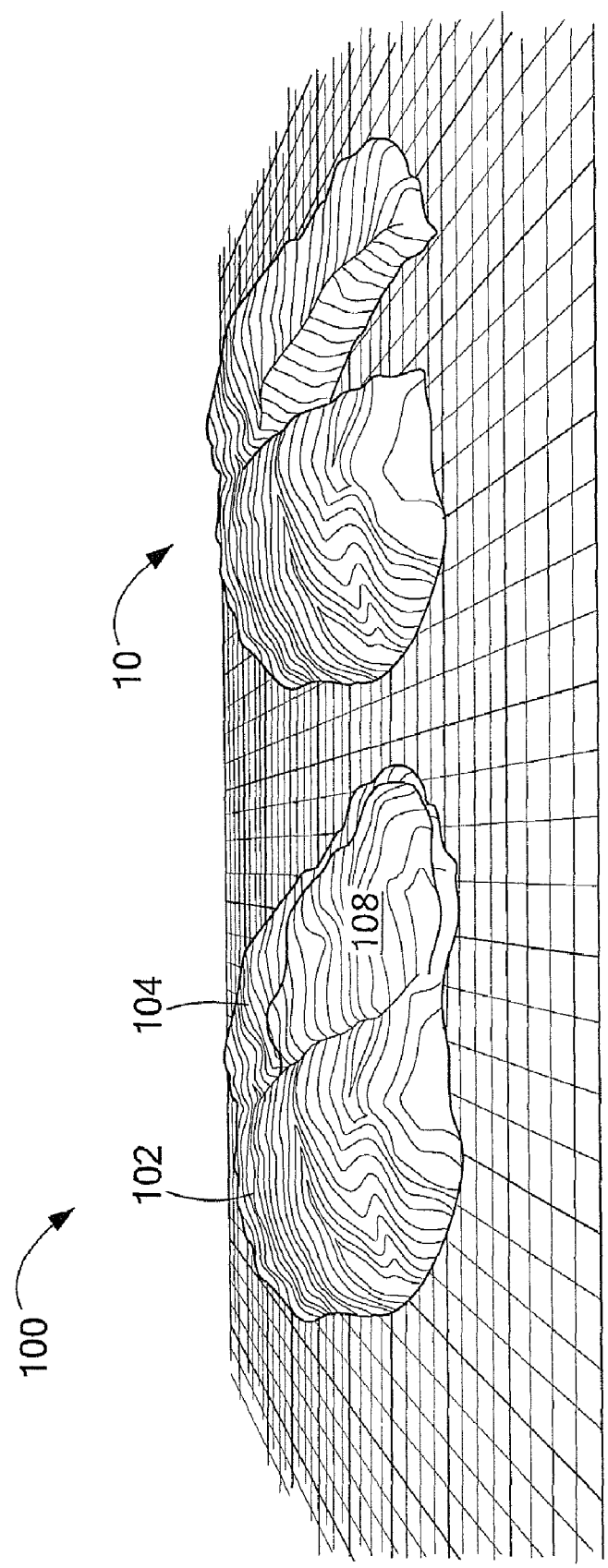
FIG. 4B shows a front pictorial view of a fish fillet processed in accordance with exemplary embodiments of the invention.

The butterflied portion 106 is then folded over to rest on the belly portion 104 of the fillet 100 as shown in FIG. 4A. With the butterflied portion 106 folded over onto the belly portion 104 of the fillet, the thickness of the fillet is generally consistent across the fillet as shown in FIG. 4B. A prior art fillet 10 is also shown for comparison with the fillet 100 having substantially even thickness.

As used herein, the term "across the fillet" refers to the fillet from the belly to the dorsal portions of the fish along a line generally located in the middle portion, e.g., middle third, of the fillet. In general, an attempt is made to balance the average height of the loin section 12 and the belly section 14.

Figure 4C:
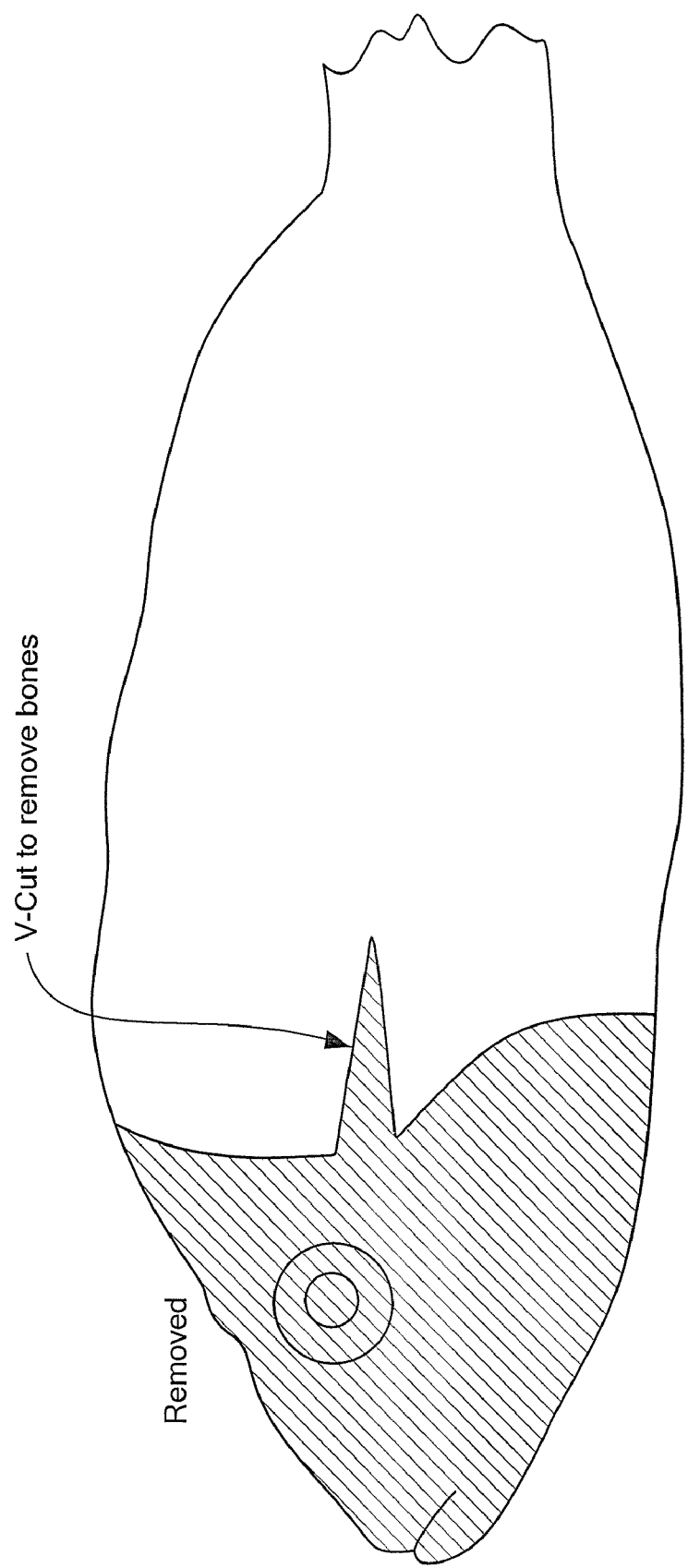
FIG. 4C is a pictorial representation of a fish showing a v-cut.

Once the fillet is groomed, the fillet 100 can be turned over (cut side down) and placed on a tray or other surface for freezing or further processing. In general, the fillet 100 should be groomed so that the v-cut is closed, e.g., frozen against the loin portion 102. Closing the v-cut also contributes to uniform heating of the fillet during a cooking process. As is known in the art, a v-cut is a separation between the loin portion and the belly portion of the fillet extending from the tail end of the fillet as a result of bone removal. As shown in FIG. 4C, the v-cut is between the loin section and the belly section extend from the head 'end' of a fish.

Figure 5A:
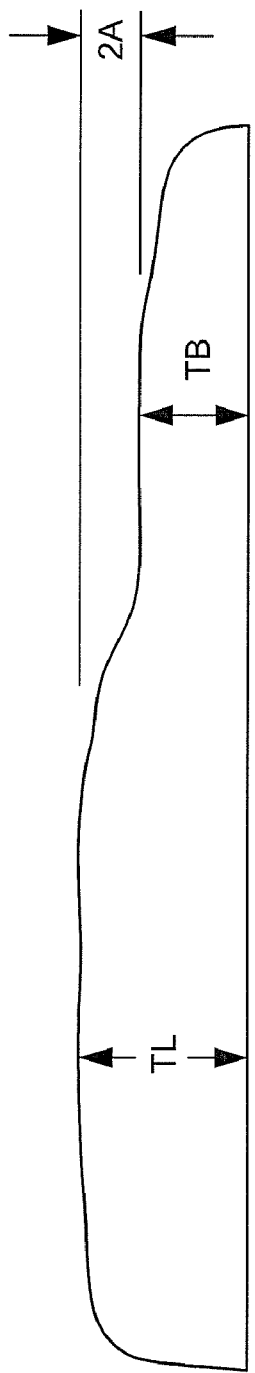
FIG. 5A shows a fish fillet having a loin portion with a thickness greater than a thickness of a belly portion of the fillet.
Figure 5B:
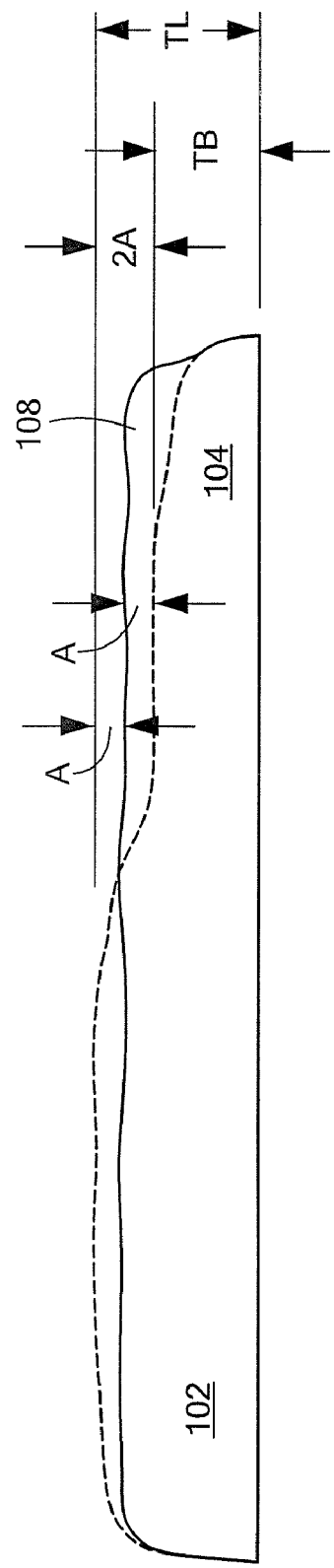
FIG. 5B shows a fish fillet having a generally uniform thickness across the fillet in accordance with exemplary embodiments of the invention.

In an exemplary embodiment, the cut in the loin portion 102 is positioned to provide a uniform thickness across the fillet. For a loin portion 102 having a thickness TL and a belly portion 104 having a thickness TB, the cut is made to remove a thickness A from the loin portion thickness. As shown in FIGS. 5A and 5B, To achieve a uniform thickness for the fillet, TL−A=TB+A, or, TL=TB+2A. That is, the cut is made at one half the difference in thickness of the loin portion 102 and the belly portion 104. Thus, when the cut is made in the loin portion 102 and the butterflied portion 108 folded over onto the belly portion 104, both sides of the fillet are about the same thickness In general, one cuts the loin portion 102 to obtain a balance, e.g., 50/50, in thickness proportion based upon the original thicknesses of the loin and belly portions. In one embodiment, the processed fillet thickness must be within 60-40 or 40-60 proportion in thickness of the two portions of the fillet to provide suitable cooking characteristics.

Figure 6:
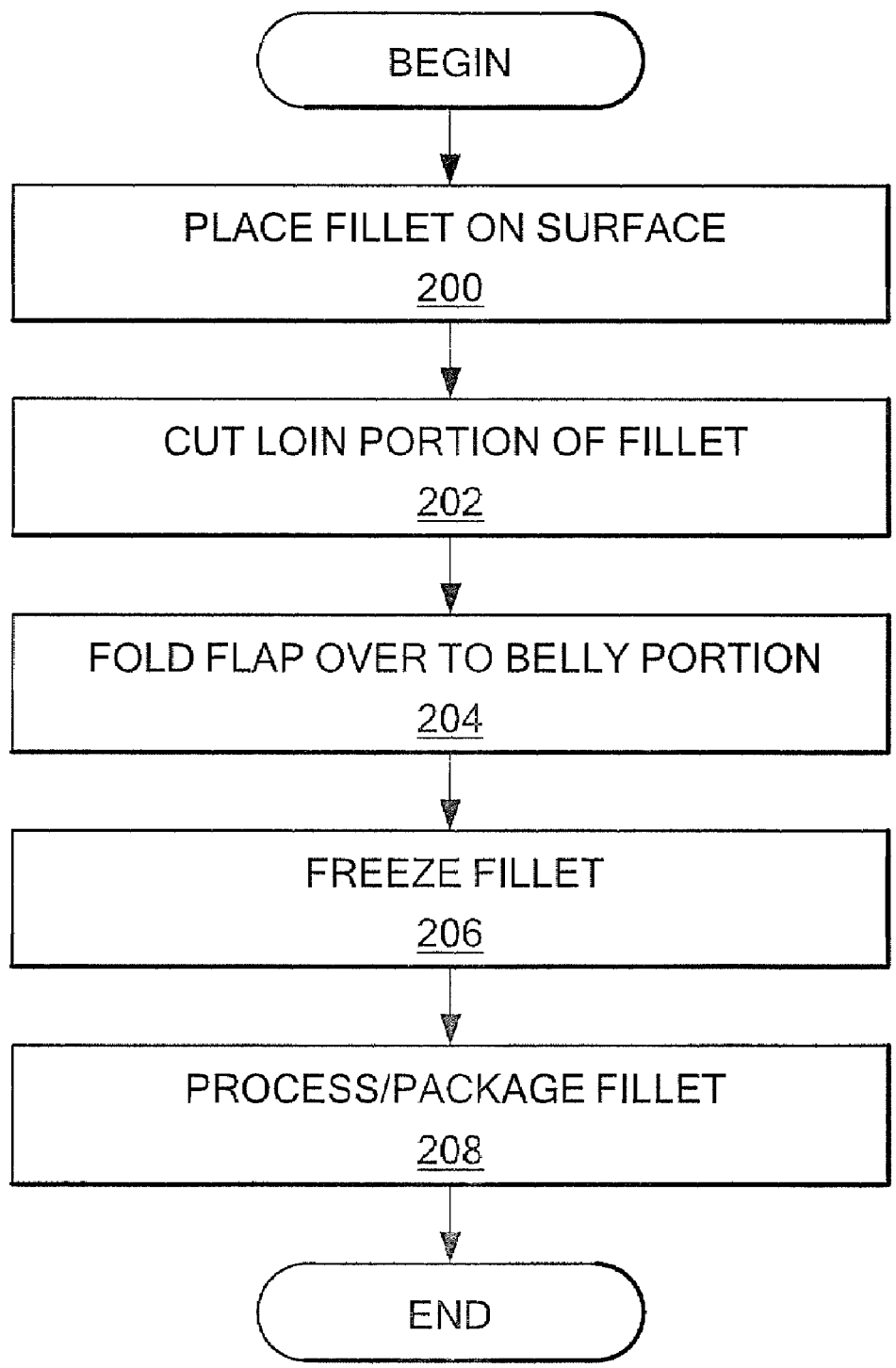
FIG. 6 is a flow diagram showing an exemplary sequence of steps for processing a fish fillet in accordance with exemplary embodiments of the invention.

FIG. 6 shows an exemplary sequence of steps to process a fillet in accordance with exemplary embodiments of the invention. In step 200, a fillet is placed on a flat surface and in step 202 a loin portion of the fillet is cut. In an exemplary embodiment, the loin is cut with a knife blade parallel to the flat surface from an outer portion of the loin towards the lateral line of the fillet. The loin portion is cut to form a butterflied portion that remains attached to the loin portion.

In step 204, the butterflied portion is manipulated over to the belly portion of the fillet so that a thickness of the fillet is generally uniform across the fillet from belly to dorsal. In an exemplary embodiment, the thickness of the butterflied portion is selected as one-half the difference in thickness between the loin portion and the belly portion. In step 206, the fillet is placed cut side down on a tray and frozen. In step 208, the fillet is further processed as desired and packaged.

In an exemplary embodiment for Tilapia fillets, the maximum thickness for the fillet is 0.5 inch. Other embodiments and other fillets having dimensions sized to meet the needs of a particular application. In general, the thickness should be selected to maximize yield from the fillets in view of the processing and packaging parameters.

While exemplary embodiments of the invention are primarily shown and described in conjunction with processing fish fillets, and particularly Tilapia fillets of preferred dimensions, it is understood that the invention is applicable to other animal protein matter of various dimensions for which it is desired to provide a generally uniform thickness. In addition, the fillet is shown and described with manual cutting and manipulation of the fillet, however, it will be readily appreciated that machines can perform one of more of the above-described process steps without departing from the present invention. Further, it is understood that the fillet can be further processed to meet the needs of a particular cooking method, which can include heat applied on one or both sides, e.g., grilling, frying, sautéing, microwaving, etc.

In addition, the inventive cutting techniques described herein prevent the fillet from falling apart because the loin flap covers the V-cut, which is made to remove the pin bones of the fish. After the V-cut is made, the loin is cut as described above that the belly region of the fillet (nape) does not separate and fall off when the fillet is cooked. Further, the yield from fillets in increased since less of the fillet is removed in comparison with prior art techniques that attempt to address thickness variation in the loin and belly portions of the fillet.

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

What is claimed is:

1. A method, comprising:
providing a fish fillet having a loin portion and a belly portion;
cutting the loin portion to provide a butterflied portion that remains attached to the loin portion;
lifting the attached butterflied portion; and
manipulating the attached butterflied portion over to the belly portion to provide a fillet having a generally uniform thickness across the fillet.

2. The method according to claim 1, further including manipulating the fillet to remove a V-cut separating the loin portion and the belly portion.

3. The method according to claim 1, wherein the fillet is a Tilapia fillet.

4. The method according to claim 3, wherein the thickness is less than about 0.5 inch.

5. The method according to claim 1, further including freezing the fillet with the butterflied portion down.

6. The method according to claim 1, further including making the cut in a direction toward the lateral line of the fillet.

7. The method according to claim 1, wherein a thickness of the butterflied portion is about one-half of a difference in thickness between the loin portion and the belly portion.

8. A fillet processes in accordance with claim 1.

9. A fillet processed in accordance with claim 7.

10. A fish fillet, comprising
a loin portion having a loin thickness and a belly portion having a belly thickness; and
a butterflied portion cut from the loin portion and folded over to the belly portion of the fillet so as to provide a generally uniform thickness across the fillet.

11. The fillet according to claim 10, wherein the fillet is a Tilapia fillet.

12. The fillet according to claim 11, wherein the uniform thickness across the fillet is less than about 0.5 inch.

13. The fillet according to claim 10, wherein the loin portion and the belly portion abut along the length of the fish to remove a v-cut in the fillet.

14. The fillet according to claim 10, further including a tray on which the fillet is placed with the butterflied portion adjacent the tray.

15. The fillet according to claim 10, wherein the fillet is frozen.

* * * * *

UNITED STATES PATENT AND TRADEMARK OFFICE
CERTIFICATE OF CORRECTION

PATENT NO. : 7,384,330 B1 Page 1 of 1
APPLICATION NO. : 11/777326
DATED : June 10, 2008
INVENTOR(S) : Picanco et al.

It is certified that error appears in the above-identified patent and that said Letters Patent is hereby corrected as shown below:

Col. 2, line 67, delete "extend" and replace with -- extending --.

Col. 3, line 6, delete ", To" and replace with -- , to --.

Col. 3, line 12, delete "thickness" and replace with -- thickness. --.

Col. 3, line 37, delete "having" and replace with -- have --.

Col. 3, line 49, delete "of" and replace with -- or --.

Col. 3, line 59, delete "above that" and replace with -- above so that --.

Col. 4, line 1, delete "in" and replace with -- is --.

Col. 4, line 38, delete "processes" and replace with -- processed --.

Col. 4, line 40, delete "comprising" and replace with -- comprising: --.

Signed and Sealed this

Seventh Day of October, 2008

JON W. DUDAS
*Director of the United States Patent and Trademark Office*